(12) United States Patent
Niemeijer et al.

(10) Patent No.: US 10,521,816 B2
(45) Date of Patent: Dec. 31, 2019

(54) SYSTEMS, METHODS AND COMPUTER-READABLE MEDIA FOR DETERMINING OUTCOMES FOR PROGRAM PROMOTIONS

(71) Applicant: Visible World, LLC, Philadelphia, PA (US)

(72) Inventors: Gerrit Niemeijer, Maplewood, NJ (US); Claudio Marcus, Andover, NH (US)

(73) Assignee: VISIBLE WORLD, LLC, Philadelphia, PA (US)

( * ) Notice: Subject to any disclaimer, the term of this patent is extended or adjusted under 35 U.S.C. 154(b) by 361 days.

(21) Appl. No.: 13/947,218

(22) Filed: Jul. 22, 2013

(65) Prior Publication Data

US 2014/0025485 A1    Jan. 23, 2014

Related U.S. Application Data

(60) Provisional application No. 61/674,025, filed on Jul. 20, 2012.

(51) Int. Cl.
*G06Q 30/02* (2012.01)
(52) U.S. Cl.
CPC ..... *G06Q 30/0246* (2013.01); *G06Q 30/0242* (2013.01)
(58) Field of Classification Search
CPC .............. G06Q 30/00; G06Q 30/0241; G06Q 30/0242; G06Q 30/0246

(Continued)

(56) References Cited

U.S. PATENT DOCUMENTS 7,860,742 B1    12/2010    Gonzalez-Rivas
2003/0014312 A1    1/2003    Fleisher
(Continued)

FOREIGN PATENT DOCUMENTS

JP    2002-133276    5/2002
JP    2003-085444    3/2003
(Continued)

OTHER PUBLICATIONS

International Search Report and Written Opinion of the International Searching Authority, dated Nov. 27, 2013, from couterpart international application PCT/US13/51435, International Filing Date Jul. 22, 2013.

(Continued)

*Primary Examiner* — Marilyn G Macasiano
(74) *Attorney, Agent, or Firm* — BakerHostetler (57) ABSTRACT

Systems, methods and computer-readable storage media for determining an outcome of a content promotional message are described. For example, a media network may be configured to transmit content to a plurality of content playback devices, such as a television or a computing device. The content may include a content promotion message configured to promote content, such as a television program or a website, available through the media network. The content promotion message and the content may be associated with network identifiers generated by the media network for tracked content. When the content is played by the content playback device, a device identifier may be generated for the content. The device identifiers may be compared with the network identifiers to determine which, if any, content tracked by the media network has been played by the plurality of content playback devices.

33 Claims, 5 Drawing Sheets

(58) Field of Classification Search
USPC .................................................. 705/14.45
See application file for complete search history.

(56) References Cited

U.S. PATENT DOCUMENTS

| | | |
|---|---|---|
| 2006/0215991 A1 | 9/2006 | Larson et al. |
| 2008/0091516 A1 | 4/2008 | Giunta |
| 2009/0228574 A1 | 9/2009 | Maures |
| 2009/0307084 A1* | 12/2009 | Monighetti ............ G06Q 30/02 705/14.45 |
| 2012/0124368 A1 | 5/2012 | Driessen |
| 2012/0158769 A1 | 6/2012 | Gratton |

FOREIGN PATENT DOCUMENTS

| | | |
|---|---|---|
| JP | 2009-038418 | 2/2009 |
| JP | 2010-028769 | 2/2010 |
| WO | WO 2011/019473 | 2/2011 |

OTHER PUBLICATIONS

Extended European Search Report and European Search Opinion, dated Dec. 3, 2015, from corresponding European Patent Application No. 13820438.3.

\* cited by examiner

FIG. 1

*Message Impression Record*
205

*Device Identifier* 210a
*Date* 210b
*Time* 210c
*Promotion Identifier* 210d
*Record Identifier* 210e
*Metadata* 210n

*Content Impression Record*
215

*Device Identifier* 220a
*Date* 220b
*Time* 220c
*Content Identifier* 220d
*Record Identifier* 220e
*Network* 220f
*Owner* 220g
*Metadata* 220n

SYSTEMS, METHODS AND COMPUTER-READABLE MEDIA FOR DETERMINING OUTCOMES FOR PROGRAM PROMOTIONS

CROSS REFERENCE TO RELATED APPLICATIONS

This application claims the benefit of U.S. Provisional Application No. 61/674,025 filed on Jul. 20, 2012, the contents of which are incorporated by reference in their entirety as if fully set forth herein.

FIELD OF INVENTION

The described technology generally relates to determining outcomes for promotional messages within a media network, and, more specifically, to determining whether a promotional message and/or content associated with the promotional message is accessed by a device within the media network.

BACKGROUND

Content providers and media network operators may use program promotion advertising to promote available programming. A challenge for program promotion advertisers is measuring the effectiveness of the advertisements. According to conventional technology, effectiveness may only be determined based on sampling data and test groups. This is an inefficient and error-prone process. As such, program promotion advertisers are not able to accurately realize the effect of their advertisements on content viewers. In this type of environment, content providers and media network operators are not able to take advantage of successful program promotions and advertising campaigns or avoid ineffective advertisements that do not persuade viewers to watch the promoted programs. Accordingly, it would be beneficial to provide a method for determining the outcome of a program promotion or campaign in an automated, efficient manner that is able, among other things, to capture which advertisements are watched by which viewers and compare this information with which programs are watched by the same viewers.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a system for determining at least one outcome of at least one content promotion message within a media network may comprise a processor and a non-transitory, computer-readable storage medium in operable communication with the processor. The computer-readable storage medium may contain one or more programming instructions that, when executed, cause the processor to generate at least one network identifier for the at least one content promotion message and at least one content component associated with the at least one content promotion message, transmit the at least one content promotion message and the at least one content component to at least one content playback device, receive at least one device identifier responsive to the at least one content promotion message or the at least one content component being played at the at least one content playback device, generate at least one impression record responsive to the at least one network identifier corresponding with the at least one device identifier, and analyze the at least one impression to determine an outcome of the at least one content promotion message.

In an embodiment, a computer-implemented method for determining at least one outcome of at least one content promotion message may comprise, by a processor, generating at least one network identifier for the at least one content promotion message and at least one content component associated with the at least one content promotion message, transmitting the at least one content promotion message and the at least one content component to at least one content playback device, receiving at least one device identifier responsive to the at least one content promotion message or the at least one content component being played at the at least one content playback device, generating at least one impression record responsive to the at least one network identifier corresponding with the at least one device identifier, analyzing the at least one impression to determine an outcome of the at least one content promotion message.

In an embodiment, a content playback device for playing content within a media network may comprise a processor and a non-transitory, computer-readable storage medium in operable communication with the processor. The computer-readable storage medium may contain one or more programming instructions that, when executed, cause the processor to receive at least one content promotion message and at least one content component associated with the at least one content promotion, generate at least one device identifier responsive to the at least one content promotion message or the at least one content component being played at the at least one content playback device, and generate at least one impression record responsive to the at least one device identifier corresponding with at least one device identifier stored in an identifier database accessible by the processor.

In an embodiment, a computer-readable storage medium having computer-readable program code configured to determine at least one outcome of at least one content promotion message embodied therewith may comprise computer-readable program code configured to generate at least one network identifier for the at least one content promotion message and at least one content component associated with the at least one content promotion message, computer-readable program code configured to transmit the at least one content promotion message and the at least one content component to at least one content playback device, computer-readable program code configured to receive at least one device identifier responsive to the at least one content promotion message or the at least one content component being played at the at least one content playback device, computer-readable program code configured to generate at least one impression record responsive to the at least one network identifier corresponding with the at least one device identifier, and computer-readable program code configured to analyze the at least one impression to determine an outcome of the at least one content promotion message.

BRIEF DESCRIPTION OF THE DRAWINGS

The above and other objects of the present invention will become more readily apparent from the following detailed description taken in connection with the accompanying drawings.

DETAILED DESCRIPTION

The described technology is directed to systems, methods and computer-readable media configured to determine outcomes for promotional messages. For example, some embodiments may determine whether a user has accessed a content promotion message and/or whether the user has accessed content associated with the content promotion message. In an embodiment, a content promotion message may be an advertisement configured to promote one or more content components, such as a television program, a website, a radio station, or the like. Some embodiments may be configured to determine whether a user has accessed a content component being promoted in a particular promotional message. In this manner, a content provider and/or advertiser may determine the effectiveness of a particular promotional message, for example, in real-time and/or substantially real time.

According to some embodiments, each promotional message may be associated with a message identifier configured to classify and/or uniquely identify the promotional message. For instance, promotional messages transmitted by a content provider may be associated with a "fingerprint," "watermark," or other marking technique. Content components, such as a television episode and/or portions thereof, may be associated with a content identifier fingerprint. Impression records may be created that include the message/content identifier when the promotional message/content component is accessed by a content playing device, such as a television, radio or computing device. The impression records may be analyzed to determine outcomes associated with a promotional message, such as whether users accessed the promotional message and/or content associated with the promotional message.

Figure 1:
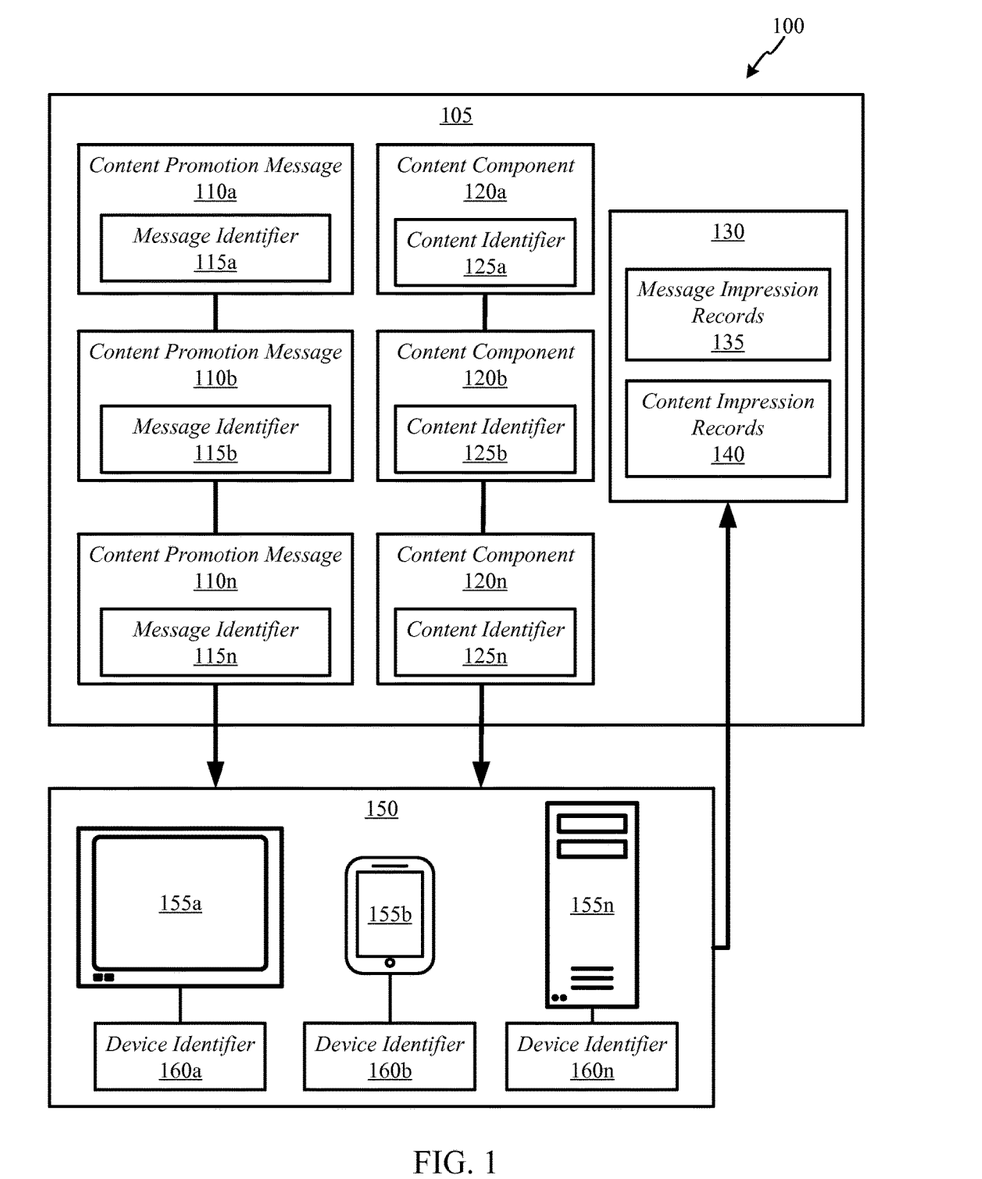
FIG. 1 depicts an illustrative media network according to some embodiments.

FIG. 1 depicts an illustrative media network according to some embodiments. As shown in FIG. 1, a media network 100 may include a media content provider 105. Non-limiting examples of a media content provider 105 include a television broadcast network, a cable television network, a satellite television network, an internet service provider (ISP), a computing device advertising network, a distributed computing network, or combinations thereof. In an embodiment, the media network 100 may be configured as a household addressable network, in which household addressable refers generally to the ability to target content to one or more households and/or household segments within the media network.

The media network 105 may include various network platforms, such as Ethernet, wireless (for instance, Wi-Fi), WiMax, cellular data network protocols (for example, third generation (3G) wireless technology, fourth generation (4G) wireless technology, including long-term evolution (LTE) technology), real-time transport protocol, real-time transport control protocol, transport control protocol/Internet protocol (TCP/IP), local area network (LAN), wireless LAN (WLAN), wide area network (WAN), or the like.

The media content provider 105 may transmit content promotional messages 110a-110n and/or content components 120a-120n to a viewer network 150 including various content playing devices 155a-155n. According to some embodiments, a content playing device 155a-155n may include any type of device capable of playing, displaying, reading, executing, or otherwise consuming data (for example, a content promotional message 110a-110n and/or a content component 120a-120n) transmitted by the media content provider 105. Illustrative and non-restrictive examples of content playing devices 155a-155n include a set-top-box (STB), a television, a smart television (a "Smart TV"), an electronic billboard, a personal computer (PC), a laptop computer, a mobile computing device, a smartphone, a tablet computing device, an electronic reader device (an "e-reader"), a gaming console, a portable gaming device, a computing device, a phablet, or the like.

In an embodiment, a media network 100 configured as a distributed computing network may include cloud or cloud-based media distribution network, such as Aereo™, Roku®, or other cloud-based networks known to those having ordinary skill in the art or developed in the future. In such an embodiment, content playing device 155a-155n may access content promotional messages 110a-110n and/or content component 120a-120n stored in cloud-based storage infrastructure associated with the media content provider 105. For example, the content promotional messages 110a-110n and/or content component 120a-120n may be streamed to the content playing device 155a-155n responsive to selection by a user from an interface executing on the content playing device, such as a software application (for example, a server and/or client application), a mobile application ("mobile app" or "app"), a web-based application, or the like. According to some embodiments, the interface and/or cloud-based storage infrastructure may be configured to emulate various hardware components associated with accessing media content, such as a digital video recorder (DVR) or STB.

A content component 120a-120n may include any type of content capable of being consumed by a content playing device 155a-155n, such as a television program, a radio program, a website, an audio stream, a video stream, a multimedia stream, an image, animation content, podcast content, Internet service application content (for instance, social network applications including Facebook®, Twitter®, or the like), blog content, message board content, electronic billboard content, or the like. A content promotional message 110a-110n may include a message configured to promote or advertise a content component 120a-120n. For instance, a content promotional message 110a-110n may be configured as a television advertisement configured to promote or advertise a particular television program (for example, "Program X" on Channel Y), episode, event (for example, a sporting event, an awards event, or a news event), or the like. In an embodiment, a media content provider 105 may transmit content promotion messages 110a-110n to the content playing device 155a-155n in an effort to persuade users to access one or more content components 120a-120n that are the subject of the content promotion messages.

Users may be influenced to access the content components 120a-120n based on various factors, such as the type of content promotion messages 110a-110n, content components 120a-120n, content playing device 155a-155n, or the like. For example, for a content promotion messages 110a-110n configured to advertise a television program content component 120a-120n, users may access the content component by tuning a television content playing device 155a-155n to a channel providing the content component. In another example, the content promotion message 110a-110n may include various indicia that may be read by a content playing device 155a-155n that may redirect the content playing device to access the advertised content component 120a-120n. For instance, the content promotion message 110a-110n may include a quick response (QR) code that may be read by a content playing device 155a-155n, such as a smartphone, tablet computing device, or an input device associated therewith, that may open a mobile app and/or redirect a browser to a website. In a further example, the content promotion message 110a-110n may be configured as part of an interactive advertising campaign, such as through an interactive electronic billboard device. In such an example, a user may establish a connection with the interactive electronic billboard device using a content playing device 155a-155n, such as a smartphone or tablet computing device. For instance, the connection may be established using one or more communication protocols known to those having ordinary skill in the art, such as Ethernet, Wi-Fi, Bluetooth®, infrared, or the like. The user may interact with the content promotion message 110a-110n being displayed on the electronic billboard device, such as through a software application, mobile app, or the like executed on the electronic billboard device and/or the content playing device 155a-155n, for instance, to access a content component 120a-120n such as a website or an advertisement that may be displayed on the electronic billboard device. The electronic billboard device may be in communication with the media content provider 105, for instance, through Ethernet, plain old telephone service (POTS), serial, or the like, such that information associated with user interaction therewith may be stored and/or analyzed by the media content provider (see FIG. 2 and FIG. 3).

As shown in FIG. 1, each content promotion message 110a-110n may include a message identifier 115a-115n configured to identify the content promotion message within the media network 100. In addition, each content component 120a-120n may include a content identifier 125a-125n configured to identify the content component within the media network 100. Furthermore, each content playing device 155a-155n may include a device identifier 125a-125n configured to identify the content component within the media network 100.

According to some embodiments, the message identifiers 115a-115n and/or the content identifiers 125a-125n may be generated by the media content provider 105 ("network identifiers") and/or the content playing devices 155a-155n ("device identifiers), as described more fully below (see FIGS. 3 and 4). The message identifiers 115a-115n and/or content identifiers 125a-125n may be generated using various methods. For example, automatic content recognition (ACR), pattern recognition, quick response (QR) codes, closed caption analysis, and any other method for recognizing and/or generating identifiers (for instance, electronically stored digital identifiers) for content known to those having ordinary skill in the art or developed in the future.

Message impression records 135 (see FIG. 2) may be generated responsive to content promotion messages 110a-110n being consumed by the content playing devices 155a-155n. According to some embodiments, the message impression records 135 may be configured to document whether a content promotion message 110a-110n has been consumed by a content playing device 155a-155n, for instance, so that the media content provider 105 may determine which content promotion messages reached which viewers. For example, a message impression record 135 may be generated when a viewer watches a television advertisement content promotional message 110a on a television content playing device 155a. In this manner, the media content provider 105 may determine that the viewer associated with the device identifier 160a watched the content promotional message 110a.

Content impression records 140 (see FIG. 2) may be generated responsive to content components 120a-120n being consumed by the content playing devices 155a-155n. The content impression records 140 may be configured to document whether a content component 120a-120n has been consumed by a content playing devices 155a-155n, for instance, so that the media content provider 105 may determine which content components reached which viewers. For instance, a content impression record 140 may be generated when a viewer watches a television episode content component 120a on a television content playing device 155a. In this manner, the media content provider 105 may determine that the viewer associated with the device identifier 160a watched the content component 110a.

In an embodiment, the message impression records 135 and/or the content impression records 140 may be stored in a database 130 accessible within the media network 100. According to some embodiment, information stored in the database 130 may be available outside of the media network 100, for example, to one or more third parties (not shown) configured to analyze the information stored therein. An illustrative third party may include an advertiser, a programming coordinator, a service provider, or the like.

As described in more detail below, the message impression records 135 and/or the content impression records 140 may be analyzed in order to determine outcomes associated with the content promotion messages 110a-110n and/or the content components 120a-120n. For example, the message impression records 135 may indicate which users were exposed to which content promotion messages 110a-110n and the content impression records 140 may indicate which users were exposed to which content promotion messages 110a-110n. Analysis of the message impression records 135 and/or the content impression records 140 may indicate whether a content promotion messages 110a-110n was effective. For instance, whether a higher percentage of users exposed to particular content promotion message accessed a content component 120a-120n that was promoted in the content promotion message compared to users that did not access the particular content promotion message.

Figure 2:
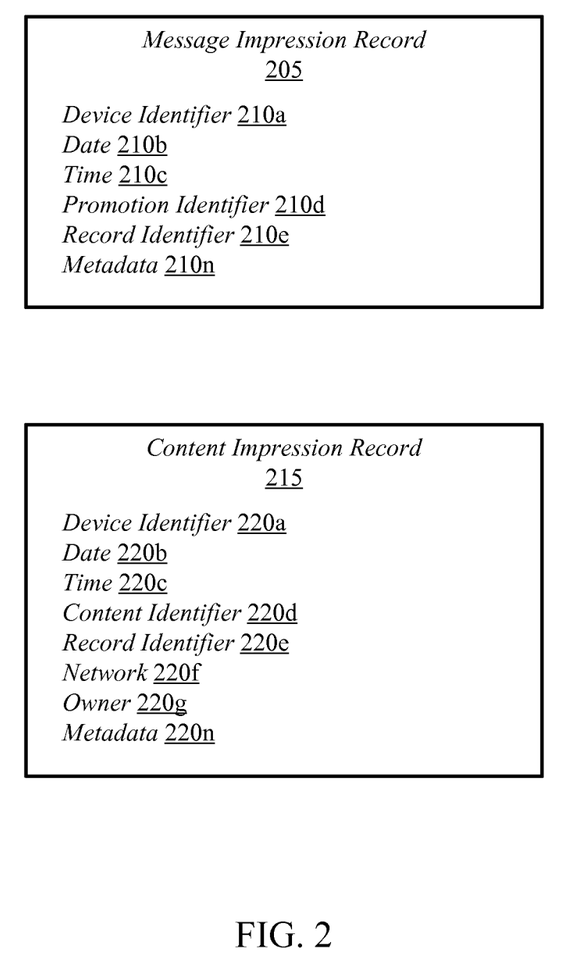
FIG. 2 depicts an illustrative message impression record and an illustrative content impression record according to some embodiments

FIG. 2 depicts an illustrative message impression record and an illustrative content impression record according to some embodiments. As shown in FIG. 2, a message impression record 205 may include various record elements 210a-210n configured to provide information about the impression (for example, accessing, viewing, consumption, or the like) of a content promotion message by a content playing device. Examples of record elements for a message impression record 205 may include, without limitation, a device identifier 210a of a content playing device that consumed a content promotion message, a date 210b and time 210c that the content promotion message was consumed, a promotion identifier 210d of the associated content promotion message, a unique record identifier 210e for the particular message impression record, metadata 210n configured to include other information for the message impression record, and any other type of record element that may be used according to embodiments provided herein.

A content impression record 215 may include various record elements 220a-210n configured to provide information about the impression (for example, accessing, viewing, consumption, or the like) of a content component by a content playing device. Illustrative and non-restrictive examples of record elements for a content impression record 215 include a device identifier 220a, date 220b and time 220c indicators, a content identifier 220d of the associated content component, a network 220f element configured to indicate which network the content playing device belongs to, an owner 220g element configured to indicate an owner, subscriber, or the like associated with the content playing device and/or media network account, metadata 220n, and any other type of record element that may be used according to embodiments provided herein.

Figure 3:
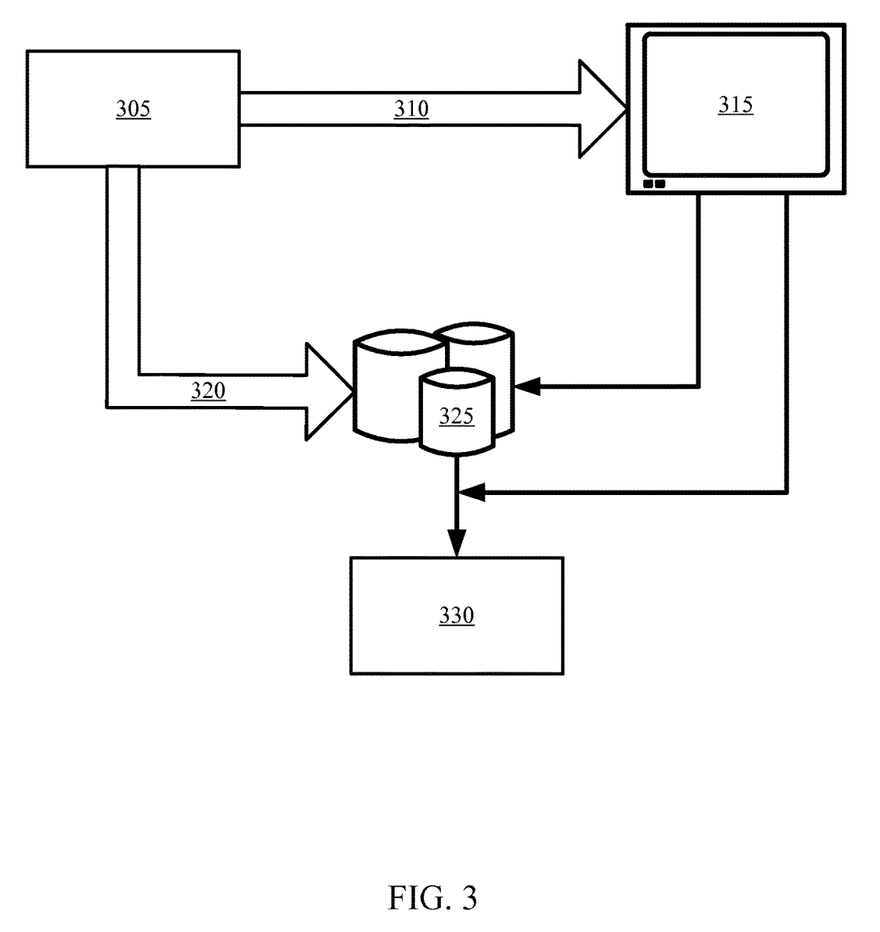
FIG. 3 depicts an illustrative content delivery system according to a first embodiment

FIG. 3 depicts an illustrative content delivery system according to a first embodiment. As shown in FIG. 3, a content provider 305 may be configured to transmit content 310 to a content playing device 315. The content 310 may include content components and/or content promotion messages. According to some embodiments, the content playing device 315 may include television (TV) configured as a "Smart TV," "Connected TV," "Hybrid TV," or other TV having built-in network connectivity and web-based technology. In an embodiment, connectivity may be implemented through wired or wireless technology known to those having ordinary skill in the art. For instance, Ethernet or Wi-Fi (for example, over an ISP network), using an existing network connection, such as an Internet connection at a home in which the Smart TV is located. In an embodiment, web-based technology may include any type of software, such as a web browser, configured to access interactive content.

A Smart TV used according to some embodiments may include an automatic content recognition (ACR) feature. ACR may be configured to monitor content played using the Smart TV and automatically recognize certain content. In an embodiment, the ACR feature of a Smart TV used according to some embodiments may calculate unique checksum values for content (such as content promotion message, a content component and/or portions thereof) for use as a content "fingerprint" to recognize the content. A fingerprint may be calculated from audio and/or video portions of content. As described in more detail below, fingerprints may be calculated for content before transmission (for example, as a "pre-transmission" fingerprint or a network identifier) that a media network operator and/or user may want to recognize and the fingerprints may be stored in a database. The Smart TV may generate fingerprints for content that is being viewed therewith (for example, as a "viewed-content" fingerprint or a device identifier). The fingerprints may be analyzed to determine whether certain predefined content are recognized. For example, the viewed-content fingerprints (or device identifiers) may be compared with the pre-transmission fingerprints (or network identifiers) to determine whether content viewed by a user matches content pre-selected by a content provider.

Referring again to FIG. 3, the content provider 305 may transmit pre-selected content 320 that the content provider seeks to be recognized. Network identifiers or fingerprints may be generated for the pre-selected content 320 that may be stored in a fingerprint database 325. The content provider 305 may transmit content 310 to the Smart TV 315. In an embodiment, the Smart TV 315 may have a memory device, cache device, or other storage device configured to store cached fingerprints of content 310 presented through the content playing device. The Smart TV 315 may present the content 310 to a user. According to some embodiments, presentation of the content 310 may be live (for example, presenting a television program on a display element of the Smart TV 315) or time-shifted (for example, recording and/or presenting a recorded television program through a digital recording element accessible by the Smart TV). While presenting the content 310 to a user, the Smart TV 315 may generate device identifiers for the content 310. For example, the Smart TV 315 may generate one fingerprint per content offering (for instance, a television episode, commercial and/or portions thereof), a predetermined number of fingerprints per content offering, one fingerprint per interval (for instance, one every five seconds), continuous fingerprinting, or combinations thereof.

The fingerprints generated by the Smart TV 315 may be compared with fingerprints stored locally on the Smart TV and/or fingerprints stored in the fingerprint database 325. According to some embodiments, a trigger 330 may be initiated responsive to matching fingerprints. The trigger 330 may be initiated by various sources including, without limitation, the Smart TV 315, the fingerprint database 325, a server and/or software associated with the content provider 305. The trigger 330 may be configured according to some embodiments to include various events, such as an additional payload, metadata, reporting functions, or the like.

Figure 4:
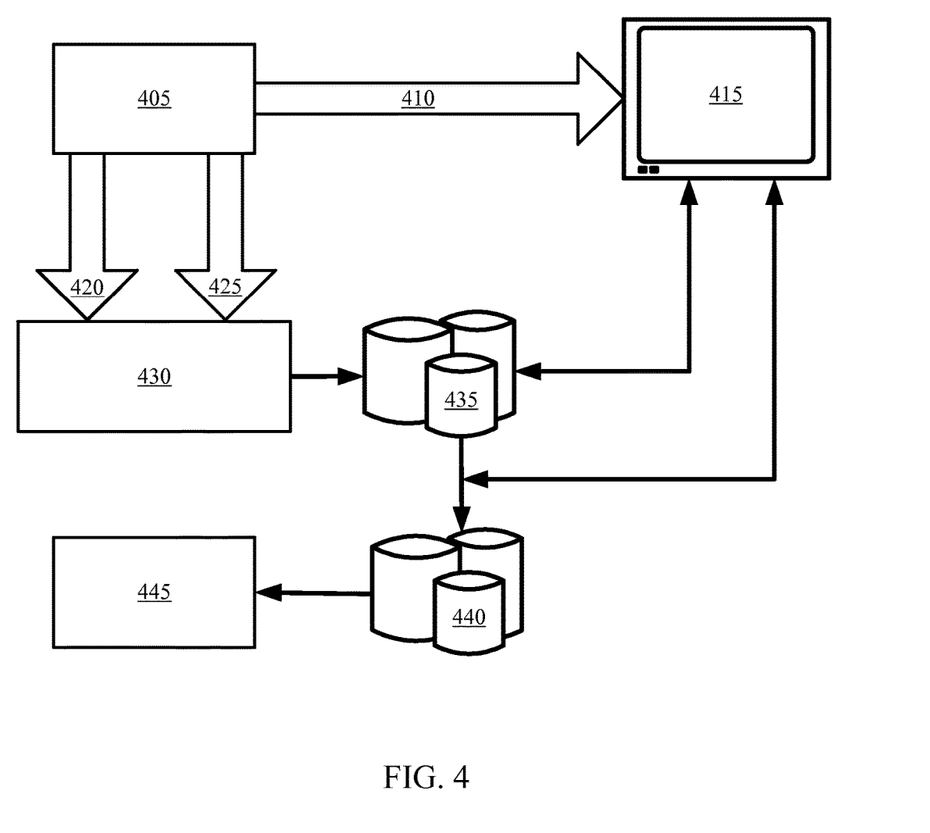
FIG. 4 depicts an illustrative content delivery system according to a second embodiment.

FIG. 4 depicts an illustrative content delivery system according to a second embodiment. As shown in FIG. 4, a content provider 405 may be configured to transmit content 410 to a content playing device 415, such as a television or Smart TV, for playback thereon. The content provide 405 may transmit content promotion messages 420 and/or content components 425 to a fingerprinting server configured to generate network identifiers, for instance, content provider fingerprints. In an embodiment, the content provider fingerprints may be stored in a fingerprint database 435. The content provider fingerprints may be generated based on various methods. For instance, the content provider fingerprints may be generated based on fingerprint generation techniques used by other system components, such as an ACR configuration of a Smart TV content playback device 415.

An impression record may be generated responsive to content 410 being played (for example, live and/or time-shifted) through the content playback device 415. For example, an ACR feature of a Smart TV content playback device 415 may generate a device identifier or fingerprint for a program promotion message (for instance, a television commercial promoting a television program) being displayed thereon. The device fingerprint may be stored locally at the Smart TV content playback device 415 or in a fingerprint database 435. The fingerprint database 435 may be analyzed (for instance, by the Smart TV content playback device 415, the ACR feature and/or a computing device associated with the content provider 405) to determine whether the device fingerprint matches a content provider fingerprint. According to some embodiments, a match may indicate that a user is accessing content 410 that matches content 420, 425 designated by the content provider 405 (for example, a user is watching a television commercial/episode that the content provider seeks to track). If a match is located for the program promotion message 410, a message impression record may be generated and stored in an impression database 440.

A device fingerprint may be generated responsive to a content component, such as the television program associated with the program promotion message described above, and stored locally at the Smart TV content playback device 415 or in the fingerprint database 435. If a match for the device fingerprint is located, as described above, then a content impression record may be generated and stored in an impression database 440. Some embodiments provide that multiple impression records may be generated for content promotion messages and/or content components, for example, one for each time they are consumed by a content playback device 415.

The information stored in the fingerprint database 435, impression database 440 and/or content playback device 415 may be analyzed 445 to determine various outcomes of the content promotion messages. For example, to determine an effect of one or more content promotion messages on viewing behavior of system users in relation to the promoted content. In an embodiment, the fingerprint database 435, impression database 440 and/or content playback device 415 may be updated in real-time or substantially real time. As such, these information sources 415, 435, 440 may be analyzed 445 in real-time and/or substantially real-time to provide an updated and/or dynamic outcome of the content promotion messages.

According to some embodiments, the real-time or substantially real time information stored in the fingerprint database 435, impression database 440 and/or content playback device 415 may be used to adapt a promotional campaign based on user interaction with the content 410. For example, the real-time or substantially real time information may indicate to the content provide 405 associated with a redirect campaign (such as a website banner advertisement redirect campaign) that users are responding more favorably to a first advertisement than a second advertisement (for instance, users are accessing a first website advertised in the first advertisement at a higher rate than a second website advertised in the second advertisement). The content provider 405 may modify the second advertisement to match certain characteristics of the first advertisement and/or increase the use of the first advertisement and decrease the use of the second advertisement.

Although some embodiments may be configured to generate impression records using ACR features of a content playback device 415, embodiments are not so limited, as any technology capable of generating impression records according to some embodiments is contemplated herein. For instance, impression records may be generated based on clickstream information, such as clickstream information configured to track user activities on a television, set top box, computing device, or the like. The user activities may be tracked using various methods known to those having ordinary skill in the art, such as through logging key presses on a remote control, keyboard, and/or a computing device configured to operate a content playback device. Illustrative computing devices include smartphones and/or tablet computing devices configured to operate as a content playback device controller. In an embodiment, the computing device configured to operate the content playback device may be configured to execute ACR software, for example, for recognizing content promotion messages and/or content components and generating impression records. According to some embodiments, content accessed through an Internet protocol (IP) platform, such as through a computing device and/or Smart TV, may use a pixel-based tracking application for tracking content promotion messages and/or content components.

The described technology provides multiple technological advantages. A non-limiting example of an advantage is that a content provider, advertiser, media network operator, or the like may be able to determine the outcome of a content promotional campaign, including the effectiveness of a content promotion message and/or content promotion message campaign. In general, the outcome or effectiveness may indicate the ability of a content promotion message and/or content promotion message to cause viewers to access content associated with the content promotion message and/or content promotion message. For example, an outcome of a content promotion message promoting a television episode (for instance, a particular episode of a television program) may indicate whether the content promotion message was successful in leading more viewers to watch the episode than may have without the content promotion message.

According to some embodiments, the content promotion message and/or content promotion message campaign may be configured to provide various applications. One non-limiting application may include transmission of different versions of a content promotion message and/or transmission of a content promotion message to different network segments, such as different demographic segments. In such an application, a content provider may be able to compare the viewing habits of households that received a content promotion message versus households that did not receive the message and/or received a different version to determine an outcome, such as whether there is any difference in viewership of a content component between households that received different content promotion messages, fewer content promotion messages and/or no content promotion messages. In another non-limiting application, the content promotion message may be transmitted within various content components (such as different television shows having different demographic audiences). Further non-limiting application may include varying the frequency, insertion times, networks of the content promotion message among households.

According to some embodiments, the different applications may be analyzed for their outcome or effectiveness and content providers, advertisers or the like may use this information when generating content promotion messages, content promotion campaigns, and or buying/selling advertising slots.

Figure 5:
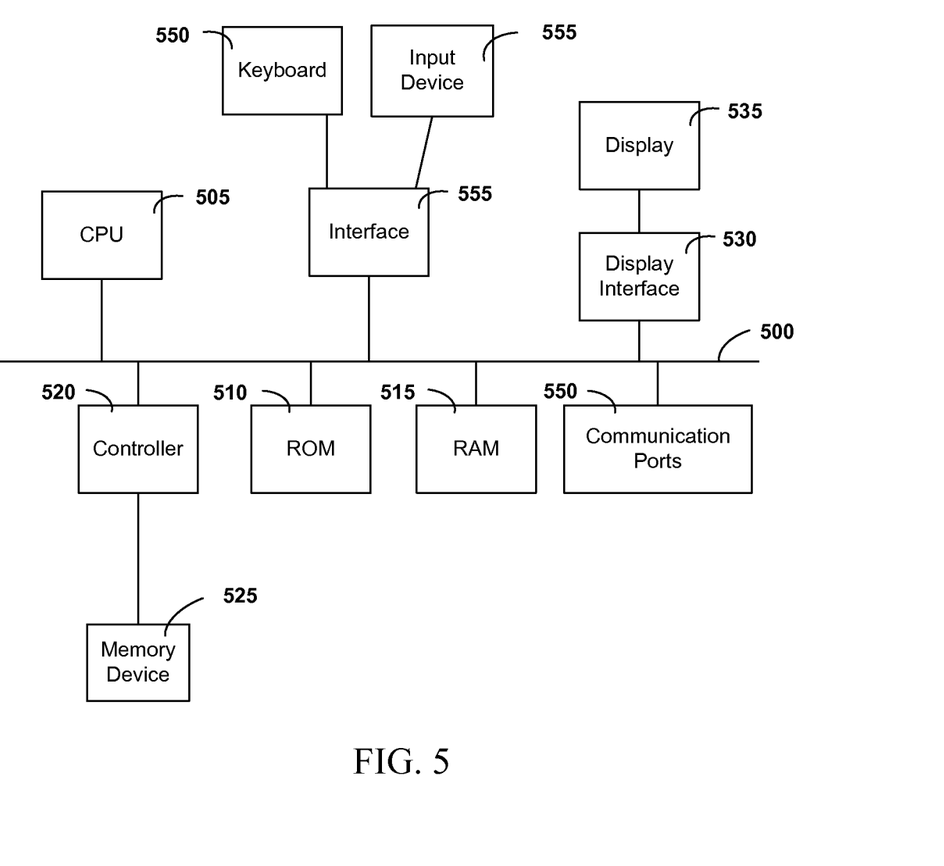
FIG. 5 depicts a block diagram of exemplary internal hardware that may be used to contain or implement the various computer processes and systems as discussed above.

FIG. 5 depicts a block diagram of exemplary internal hardware that may be used to contain or implement the various computer processes and systems as discussed above. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an exemplary processing device, computing device or processor as such terms are used within this disclosure. Read only memory (ROM) 530 and random access memory (RAM) 535 constitute exemplary memory devices.

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices. Additionally, the memory devices 525 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the functional steps associated with the determining an outcome of a content promotion message making as described above may be stored in the ROM 530 and/or the RAM 535. Optionally, the program instructions may be stored on a tangible computer-readable medium such as a compact disk, a digital disk, flash memory, a memory card, a USB drive, an optical disc storage medium, such as a Blu-ray™ disc, and/or other recording medium.

An optional display interface 530 may permit information from the bus 500 to be displayed on the display 535 in audio, visual, graphic or alphanumeric format. The information may include information related to a current job ticket and associated tasks. Communication with external devices may occur using various communication ports 540. An exemplary communication port 540 may be attached to a communications network, such as the Internet or a local area network.

The hardware may also include an interface 545 which allows for receipt of data from input devices such as a keyboard 550 or other input device 555 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which alternatives, variations and improvements are also intended to be encompassed by the following claims.

What is claimed is:

1. A system comprising:
   at least one processor; and
   a non-transitory, computer-readable storage medium in operable communication with the at least one processor, wherein the computer-readable storage medium contains one or more programming instructions that, when executed, cause the at least one processor to:
   transmit, to at least one content playback device, at least one content promotion message associated with at least one content component promoted by the at least one content promotion message;
   generate, responsive to the at least one content promotion message being played by the at least one content playback device, at least one message impression record comprising a device identifier associated with the at least one content playback device and at least one message identifier associated with the at least one content promotion message;
   generate, responsive to the at least one content component being played by the at least one content playback device, at least one content impression record comprising the device identifier and at least one content identifier associated with the at least one content component;
   compare the generated at least one message impression record and the generated at least one content impression record; and
   determine, based on the comparing, a value indicative of an effectiveness of the at least one content promotion message.

2. The system of claim 1, wherein the at least one content promotion message comprises an advertisement promoting the at least one content component.

3. The system of claim 2, wherein the advertisement comprises a television commercial.

4. The system of claim 1, wherein the at least one content component comprises at least one of: a television program, a television episode, a television event, a radio program, a website, an image, animation content, podcast content, Internet service application content, blog content, message board content, or electronic billboard content.

5. The system of claim 1, wherein the generating the at least one message impression record comprises:
   monitoring content played by the at least one content playback device;
   detecting, based on automatic content recognition, that the at least one content promotion message was played by the at least one content playback device;
   generating, based on the detecting, a first fingerprint associated with the at least one content promotion message; and
   determining whether the first fingerprint matches a second fingerprint associated with content promotion message tracked by a content provider.

6. The system of claim 1, wherein the at least one content playback device comprises at least one of: a television, a smart television, a smartphone, a tablet computing device, a set-top-box, an electronic billboard, an electronic reader device, a gaming console, a portable gaming device, a computing device, or a phablet.

7. The system of claim 1, wherein the at least one content playback device is configured to execute automatic content recognition to generate the at least one message impression record and to generate the at least one content impression record.

8. The system of claim 1, wherein the value indicates the effectiveness of the at least one content promotion message at increasing playback of the at least one content component.

9. The system of claim 1, wherein the generating the at least one content impression record comprises:
   monitoring content played by the at least one content playback device;
   detecting, based on automatic content recognition, that the at least one content component was played by the at least one content playback device;
   generating, based on the detecting, a first fingerprint associated with the at least one content component; and
   determining whether the first fingerprint matches a second fingerprint associated with content promoted by a content provider.

10. The system of claim 1, wherein the generating the at least one content impression record comprises tracking a user activity on the at least one content playback device, wherein the user activity comprises a key press on a user input device.

11. The system of claim 1, wherein the generating the at least one message impression record comprises tracking a user activity on the at least one content playback device, wherein the user activity comprises a key press on a user input device.

12. A method comprising:
transmitting, to at least one content playback device, at least one content promotion message associated with at least one content component promoted by the at least one content promotion message;
generating, responsive to the at least one content promotion message being played by the at least one content playback device, at least one message impression record comprising a device identifier associated with the at least one content playback device and at least one message identifier associated with the at least one content promotion message;
generating, responsive to the at least one content component being played by the at least one content playback device, at least one content impression record comprising the device identifier and at least one content identifier associated with the at least one content component;
comparing the generated at least one message impression record and the generated at least one content impression record; and
determining, based on the comparing, a value indicative of an effectiveness of the at least one content promotion message.

13. The method of claim 12, wherein the at least one content promotion message comprises an advertisement promoting the at least one content component.

14. The method of claim 13, wherein the advertisement comprises a television commercial.

15. The method of claim 12, wherein the at least one content component comprises at least one of: a television program, a television episode, a television event, a radio program, a website, an image, animation content, Internet service application content, podcast content, blog content, message board content, or electronic billboard content.

16. The method of claim 12, wherein the generating the at least one message impression record comprises:
monitoring content played by the at least one content playback device;
detecting, based on automatic content recognition, that the at least one content promotion message was played by the at least one content playback device;
generating, based on the detecting, a first fingerprint associated with the at least one content promotion message; and
determining whether the first fingerprint matches a second fingerprint associated with content promotion message tracked by a content provider.

17. The method of claim 12, wherein the at least one content playback device comprises at least one of: a television, a smart television, a smartphone, a tablet computing device, a set-top-box, an electronic billboard, an electronic reader device, a gaming console, a portable gaming device, a computing device, or a phablet.

18. The method of claim 12, wherein the at least one content playback device is configured to execute automatic content recognition to generate the at least one message impression record and to generate the at least one content impression record.

19. The method of claim 12, wherein the value indicates the effectiveness of the at least one content promotion message at increasing playback of the at least one content component.

20. The method of claim 12, wherein the generating the at least one content impression record comprises:
monitoring content played by the at least one content playback device;
detecting, based on automatic content recognition, that the at least one content component was played by the at least one content playback device;
generating, based on the detecting, a first fingerprint associated with the at least one content component; and
determining whether the first fingerprint matches a second fingerprint associated with content promoted by a content provider.

21. The method of claim 12, wherein the generating the at least one content impression record comprises tracking a user activity on the at least one content playback device, wherein the user activity comprises a key press on a user input device.

22. The method of claim 12, wherein the generating the at least one message impression record comprises tracking a user activity on the at least one content playback device, wherein the user activity comprises a key press on a user input device.

23. A device comprising:
one or more processors; and
memory storing instructions that, when executed by the one or more processors, cause the device to:
transmit, to at least one content playback device, at least one content promotion message associated with at least one content component promoted by the at least one content promotion message;
generate, responsive to the at least one content promotion message being played by the at least one content playback device, at least one message impression record comprising a device identifier associated with the at least one content playback device and at least one message identifier associated with the at least one content promotion message;
generate, responsive to the at least one content component being played by the at least one content playback device, at least one content impression record comprising the device identifier and at least one content identifier associated with the at least one content component;
compare the generated at least one message impression record and the generated at least one content impression record; and
determine, based on the comparing, a value indicative of an effectiveness of the at least one content promotion message.

24. The device of claim 23, wherein the generating the at least one message impression record comprises:
monitoring content played by the at least one content playback device;
detecting, based on automatic content recognition, that the at least one content promotion message was played by the at least one content playback device;
generating, based on the detecting, a first fingerprint associated with the at least one content promotion message; and
determining whether the first fingerprint matches a second fingerprint associated with content promotion message tracked by a content provider.

25. The device of claim 23, wherein the at least one content playback device is configured to execute automatic content recognition to generate the at least one message impression record and to generate the at least one content impression record.

26. The device of claim 23, wherein the generating the at least one content impression record comprises:
monitoring content played by the at least one content playback device;

detecting, based on automatic content recognition, that the at least one content component was played by the at least one content playback device;

generating, based on the detecting, a first fingerprint associated with the at least one content component; and determining whether the first fingerprint matches a second fingerprint associated with content promoted by a content provider.

27. The device of claim 23, wherein the generating the at least one content impression record comprises tracking a user activity on the at least one content playback device, wherein the user activity comprises a key press on a user input device.

28. The device of claim 23, wherein the generating the at least one message impression record comprises tracking a user activity on the at least one content playback device, wherein the user activity comprises a key press on a user input device.

29. A non-transitory computer-readable storage medium storing computer-readable instructions that, when executed by a processor, cause:

transmitting, to at least one content playback device, at least one content promotion message associated with at least one content component promoted by the at least one content promotion message;

generating, responsive to the at least one content promotion message being played by the at least one content playback device, at least one message impression record comprising a device identifier associated with the at least one content playback device and at least one message identifier associated with the at least one content promotion message;

generating, responsive to the at least one content component being played by the at least one content playback device, at least one content impression record comprising the device identifier and at least one content identifier associated with the at least one content component;

comparing the generated at least one message impression record and the generated at least one content impression record; and determining, based on the comparing, a value indicative of an effectiveness of the at least one content promotion message.

30. The non-transitory computer-readable storage medium of claim 29, wherein the generating the at least one message impression record comprises:

monitoring content played by the at least one content playback device;

detecting, based on automatic content recognition, that the at least one content promotion message was played by the at least one content playback device;

generating, based on the detecting, a first fingerprint associated with the at least one content promotion message; and determining whether the first fingerprint matches a second fingerprint associated with content promotion message tracked by a content provider.

31. The non-transitory computer-readable storage medium of claim 29, wherein the at least one content playback device is configured to execute automatic content recognition to generate the at least one message impression record and to generate the at least one content impression record.

32. The non-transitory computer-readable storage medium of claim 29, wherein the generating the at least one content impression record comprises:

monitoring content played by the at least one content playback device;

detecting, based on automatic content recognition, that the at least one content component was played by the at least one content playback device;

generating, based on the detecting, a first fingerprint associated with the at least one content component; and determining whether the first fingerprint matches a second fingerprint associated with content promoted by a content provider.

33. The non-transitory computer-readable storage medium of claim 29, wherein the generating the at least one content impression record and the generating the at least one message impression record comprises tracking at least one user activity on the at least one content playback device, wherein the at least one user activity comprises a key press on a user input device.

* * * * *